United States Patent
Koppeser et al.

(10) Patent No.: US 12,018,753 B2
(45) Date of Patent: Jun. 25, 2024

(54) BEARING PIVOT TENSIONER ASSEMBLY

(71) Applicant: GATES CORPORATION, Denver, CO (US)

(72) Inventors: Michael Koppeser, Windsor (CA); Roland Wille, Windsor (CA); Brandon Hooper, Windsor (CA)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 17/975,470

(22) Filed: Oct. 27, 2022

(65) Prior Publication Data

US 2023/0140725 A1    May 4, 2023

Related U.S. Application Data

(60) Provisional application No. 63/273,347, filed on Oct. 29, 2021.

(51) Int. Cl.
   *F16H 7/08*     (2006.01)
   *F16H 7/12*     (2006.01)

(52) U.S. Cl.
   CPC ............. *F16H 7/08* (2013.01); *F16H 7/0831* (2013.01); *F16H 7/1209* (2013.01); *F16H 2007/0802* (2013.01); *F16H 2007/081* (2013.01); *F16H 2007/084* (2013.01); *F16H 2007/0865* (2013.01); *F16H 2007/0893* (2013.01)

(58) Field of Classification Search
   CPC ...... F16H 7/02; F16H 7/08; F16H 2007/0802; F16H 2007/0804; F16H 2007/0806; F16H 2007/081; F16H 2007/0865; F16H 2007/0893; F16H 7/0831; F16H 7/0838; F16H 2007/084; F16H 7/0848; F16H 2007/0863; F16H 7/10; F16H 7/12; F16H 7/1209; F16H 7/1218; F16H 7/1254; F16H 7/1281
   See application file for complete search history.

(56) References Cited

U.S. PATENT DOCUMENTS

| | | | | |
|---|---|---|---|---|
| 4,392,840 | A | * | 7/1983 | Radocaj ................... F16H 7/129 474/117 |
| 4,813,915 | A | * | 3/1989 | Kotzab ................... F02B 67/06 474/135 |
| 4,816,011 | A | * | 3/1989 | Kotzab ................. F16H 7/1218 474/111 |
| 4,878,885 | A | * | 11/1989 | Brandenstein ........ F16H 7/1218 474/135 |

(Continued)

FOREIGN PATENT DOCUMENTS

| | | | | |
|---|---|---|---|---|
| DE | 3718227 A1 | * | 12/1988 | ........... F16H 7/1218 |
| DE | 102007049909 A1 | * | 4/2009 | ........... F16H 7/1218 |
| WO | WO-2009060479 A1 | * | 5/2009 | ........... F16H 7/1218 |

*Primary Examiner* — Michael R Mansen
*Assistant Examiner* — Raveen J Dias
(74) *Attorney, Agent, or Firm* — Kevin J. Aiken, Esq.

(57) ABSTRACT

A belt tensioner having a tensioner base and a tensioning arm axially aligned about a pivot shaft defining a pivot axis, the tensioning arm pivotal in relation to the tensioner base about the pivot axis. The tensioner has a bearing positioned around and sealed against the pivot shaft, with the tensioning arm positioned around the bearing. The bearing forms a radial seal between the bearing and the tensioning arm and between the bearing and the pivot shaft. A torsion spring is positioned externally around a portion of the tensioning arm.

3 Claims, 7 Drawing Sheets

(56) References Cited

U.S. PATENT DOCUMENTS

| | | | |
|---|---|---|---|
| 5,083,983 A * | 1/1992 | Hirai | F16H 7/1218 474/135 |
| 5,205,190 A * | 4/1993 | Kohring | F16H 7/02 74/574.2 |
| 5,334,109 A * | 8/1994 | Izutsu | F16H 7/1218 474/135 |
| 5,370,585 A * | 12/1994 | Thomey | F16H 7/1218 474/135 |
| 5,391,119 A * | 2/1995 | Kondo | F16H 7/1227 474/112 |
| 5,503,599 A * | 4/1996 | Brehler | F16H 7/1218 474/135 |
| 5,540,627 A * | 7/1996 | Miyata | F16H 7/1218 474/135 |
| 5,620,385 A * | 4/1997 | Cascionale | F16H 7/1218 474/135 |
| 5,718,649 A * | 2/1998 | Hong | F16H 7/1218 474/135 |
| 5,759,125 A * | 6/1998 | Berg | F16H 7/1218 474/135 |
| 5,803,850 A * | 9/1998 | Hong | F16H 7/1227 474/135 |
| 6,001,037 A * | 12/1999 | Rocca | F16H 7/1281 474/135 |
| 6,231,465 B1 * | 5/2001 | Quintus | F16H 7/1218 474/135 |
| 6,264,578 B1 * | 7/2001 | Ayukawa | F16H 7/1218 474/135 |
| 6,497,632 B2 * | 12/2002 | Ayukawa | F16H 7/1218 474/135 |
| 6,648,783 B1 * | 11/2003 | Bogner | F16H 7/1281 474/134 |
| 6,767,303 B2 * | 7/2004 | Ayukawa | F16H 7/1218 474/135 |
| 6,855,079 B2 * | 2/2005 | Cura | F16H 7/1281 474/135 |
| 7,217,207 B1 * | 5/2007 | Hallen | F16H 7/129 474/135 |
| 7,637,829 B2 * | 12/2009 | Stone | F16H 7/1281 474/135 |
| 7,837,582 B2 * | 11/2010 | Smith | F16H 7/1281 474/138 |
| 7,951,030 B2 * | 5/2011 | Ward | F16H 7/1218 474/135 |
| 7,985,151 B2 * | 7/2011 | Singer | F16H 7/1281 474/135 |
| 8,157,682 B2 * | 4/2012 | Serkh | F16H 7/1218 474/166 |
| 10,094,450 B2 * | 10/2018 | Simmons | F16H 7/0831 |
| 10,323,731 B2 * | 6/2019 | Tronquoy | F16H 7/1218 |
| 10,508,719 B2 * | 12/2019 | Lee | F16H 39/00 |
| 10,718,410 B2 * | 7/2020 | Cariccia | F16H 7/0829 |
| 10,859,141 B2 * | 12/2020 | Frankowski | F16H 7/1218 |
| 11,333,223 B2 * | 5/2022 | Koppeser | F16H 7/12 |
| 2002/0010044 A1 * | 1/2002 | Ayukawa | F16H 7/1218 474/135 |
| 2004/0063531 A1 * | 4/2004 | Cura | F16H 7/1281 474/135 |
| 2004/0097311 A1 * | 5/2004 | Smith | F16H 7/1281 474/135 |
| 2005/0146127 A1 * | 7/2005 | Schonmeier | F16H 7/1218 280/806 |
| 2006/0035740 A1 * | 2/2006 | Lehtovaara | F16H 7/129 474/237 |
| 2006/0068957 A1 * | 3/2006 | Stone | F16H 7/1281 474/135 |
| 2006/0243150 A1 * | 11/2006 | Landrieve | F16H 7/1281 101/494 |
| 2008/0058141 A1 * | 3/2008 | Pendergrass | F16H 7/1218 474/135 |
| 2008/0119311 A1 * | 5/2008 | Wilhelm | F16H 7/1218 474/135 |
| 2008/0125260 A1 * | 5/2008 | Wilhelm | F16H 7/1218 474/135 |
| 2008/0153642 A1 * | 6/2008 | Baumuller | F16H 7/1236 474/101 |
| 2008/0287233 A1 * | 11/2008 | Cantatore | F16H 7/1218 474/112 |
| 2009/0054186 A1 * | 2/2009 | Stegelmann | F16H 7/1281 474/135 |
| 2010/0137083 A1 * | 6/2010 | Carlson | F16H 7/1218 474/110 |
| 2010/0144473 A1 * | 6/2010 | Ward | F16H 7/1281 474/112 |
| 2010/0190594 A1 * | 7/2010 | Rolando | F16H 7/1281 474/112 |
| 2011/0015017 A1 * | 1/2011 | Serkh | F16H 7/1218 474/135 |
| 2011/0135444 A1 * | 6/2011 | Lee | F04D 13/027 415/18 |
| 2011/0177897 A1 * | 7/2011 | Ward | F16H 7/1209 474/135 |
| 2011/0207568 A1 * | 8/2011 | Smith | F16H 7/1281 474/135 |
| 2011/0256969 A1 * | 10/2011 | Frankowski | F16H 7/1245 474/101 |
| 2015/0031485 A1 * | 1/2015 | Lindstrom | F16H 7/1218 474/135 |
| 2017/0002902 A1 * | 1/2017 | Cariccia | F16H 7/0829 |
| 2017/0248204 A1 * | 8/2017 | Simmons | F16H 7/08 |
| 2018/0031086 A1 * | 2/2018 | Lee | F16H 7/14 |
| 2021/0041010 A1 * | 2/2021 | Koppeser | F16H 7/10 |
| 2022/0260138 A1 * | 8/2022 | Koppeser | F16H 7/12 |
| 2022/0268342 A1 * | 8/2022 | Ronchetto | F16H 7/1218 |
| 2022/0275852 A1 * | 9/2022 | Lannutti | F16H 7/0831 |

* cited by examiner

BEARING PIVOT TENSIONER ASSEMBLY

BACKGROUND

Belt tensioners are generally well known devices that are used in many belt-drive systems. Tensioners generally apply a constant belt-tensioning force, which compensates for increases in belt length due to wear, belt expansion (e.g., due to increased temperature) and other factors.

A common type of belt tensioner has a fixed structure and a pivoted structure concentrically mounted on the fixed structure by a pivot assembly, and the pivoted structure has a belt-engaging pulley rotationally mounted on it. A coil spring surrounds the pivot assembly and has its ends connected between the fixed and pivoted structures to bias the pivot structure in a belt take-up direction. As the pivoted structure moves from a position of minimum belt take-up to a position of maximum belt take-up, the spring biasing force decreases. Despite this varying spring force over the range of tensioner movement, relatively constant belt tension is maintained by the tensioner.

There is always room for alternate designs of belt tensioners.

SUMMARY

The present disclosure provides a tensioner for a belt system that has a tensioner base and a tensioning arm axially aligned about a pivot shaft defining a pivot axis, the tensioning arm pivotal in relation to the tensioner base about the pivot axis. The tensioner has a bearing positioned around and sealed against the pivot shaft, with the tensioning arm positioned around the bearing. The bearing forms a radial seal between the bearing and the tensioning arm and between the bearing and the pivot shaft. A torsion spring is positioned externally around a portion of the tensioning arm.

In one particular implementation, this disclosure provides a belt tensioner for a belt drive, the tensioner comprising a tensioner base and a tensioning arm axially aligned about a pivot shaft defining a pivot axis, the tensioning arm pivotal in relation to the tensioner base about the pivot axis, and a bearing positioned around and sealed against the pivot shaft, the tensioning arm positioned around the bearing, and a torsion spring positioned around a portion of the tensioning arm.

In another particular implementation, this disclosure provides a belt tensioner for a belt drive, the tensioner comprising a tensioner base and a tensioning arm having a pulley connected thereto, with the tensioner base having a pivot shaft defining a pivot axis through the tensioner base and the tensioning arm, a bearing positioned radially between the pivot shaft and the tensioning arm, a compression spring positioned radially between the pivot shaft and the tensioning arm, and a damping structure positioned between the compression spring and the tensioning arm.

In yet another particular implementation, this disclosure provides a belt tensioner for a belt drive, the tensioner comprising a tensioner base and a tensioning arm, the tensioner base having a pivot shaft defining a pivot axis through the tensioner base and the tensioning arm, a bearing positioned radially between the pivot shaft and the tensioning arm, the bearing forming a radial seal between the bearing and the tensioning arm and between the bearing and the pivot shaft.

These and other aspects of the tensioner described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

DETAILED DESCRIPTION

Figure 1:
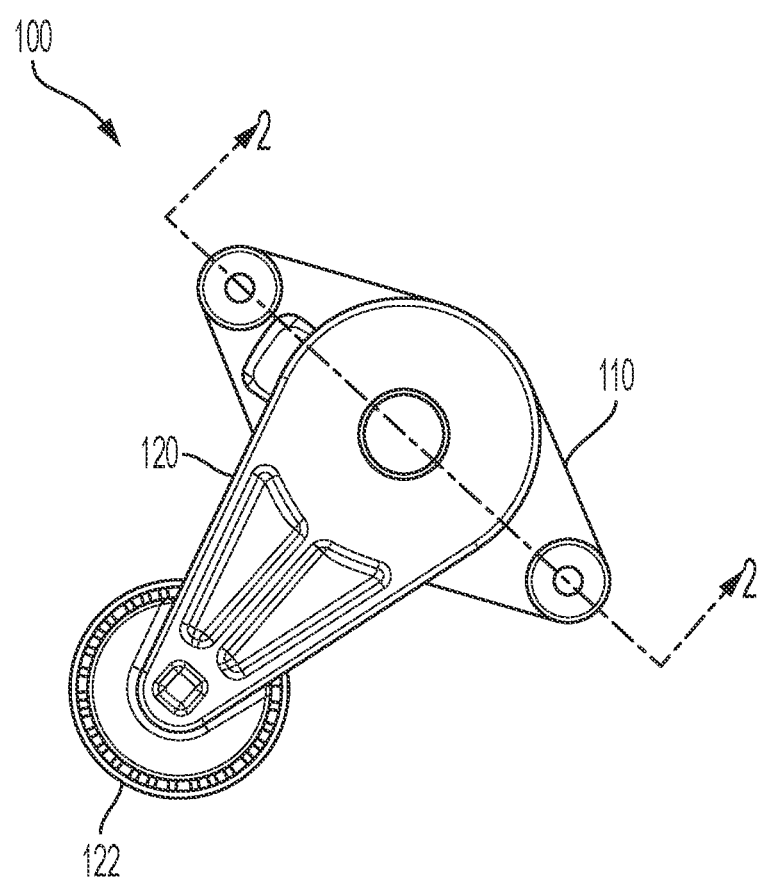
FIG. 1 is an exemplary top perspective view of a tensioner.

As indicated above, the present disclosure is directed to belt tensioners having an internal bearing to seal the inner workings of the belt tensioner.

A belt tensioner provides tension, e.g., to a FEAD (front end accessory drive), to a belt via a pulley with a bearing. The tensioner has a tensioning arm which rotates or pivots about the tensioner base, adjusting the tension on the pulley and hence the belt as the arm pivots. Internal to the tensioner, the tensioning arm and tensioner base form a cavity in which is a mechanism that generates arm motion damping and a pivot surface that provides a low friction bearing. However, there can be two paths for ingress of contaminants into this cavity; contaminants can impact the performance and durability of the tensioner by accelerating wear and/or detrimentally impacting the coefficient of friction between surfaces.

One traditional strategy for sealing tensioners to inhibit contaminants from entering the cavity is to have a labyrinth or tortuous path between the arm and base. Labyrinths between the arm and base can be integrally formed by the arm and/or base but are not always effective under extreme conditions. Often, a seal plate, which is an extra component, is used to form the labyrinth.

Another traditional strategy for sealing tensioners is to use a cap to seal off the pivot area. The cap is also an extra component, which requires an additional assembly step using pressure to seat the cap. If not seated correctly, the cap can loosen over time, e.g., during operation of the vehicle in which the tensioner is installed.

The belt tensioners of this disclosure provide an alternate mode of inhibiting contamination of the tensioner. As indicated above, the belt tensioners utilize a bearing in the cavity to seal the inner workings of the belt tensioner. A double row bearing can be used, providing a very robust bearing surface and therefore robust pulley alignment. The bearing, due to its tight fit between the pivot shaft and the tensioning arm, forms radial seals that also seal the area of a damping mechanism, such as a damping plate and/or internal compression spring, thus avoiding the need for additional mechanisms or parts to seal the tensioner. The compression spring may further seal the damping mechanism in the cavity. The compression spring forces the damping mechanism against the rotatable tensioning arm, generating friction.

The advantages provided by the belt tensioners of this disclosure include a high level of precision for the alignment of pulley bearing, and improved pivot durability against normal wear and wear attributed to contamination ingress into the interior of the tensioner. Also, the damping mechanism within the aperture benefits from a contaminate free area, providing a more consistent and stabilized damping output over time due to less contamination being present. Less wear on the damping mechanism results in more consistent torque output over time.

In other implementations, due to the use of a pivot bearing instead of a plastic or metal bushing it may be possible to seal the damping mechanism within the tensioner by the use of a seal plate or gasket to seal the area between the tensioning arm and the base. This may improve pivot durability from the use of a pivot bearing and damping mechanism.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

Turning to the figures, FIG. 1 shows a tensioner 100, such as for a FEAD (front end accessory drive). The tensioner 100 has a base structure 110 and a tensioning arm 120 that is pivotable in relation to the base structure 110 about a pivot axis of the tensioner 100. Although this tensioner 100 is particularly shown as part of a FEAD, the tensioner 100 may be modified as needed for use in any application where it would be suitable.

Figure 2:
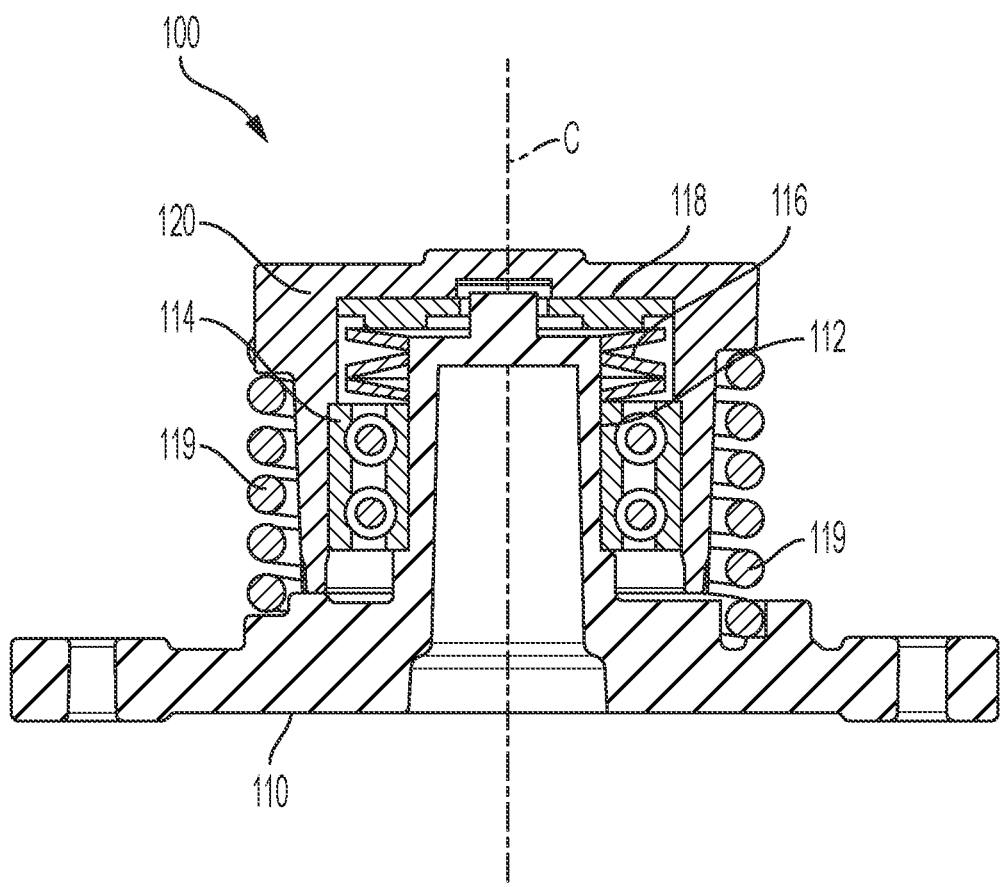
FIG. 2 is an exemplary cross-sectional side view of the tensioner taken along line 2-2 of FIG. 1.
Figure 3:
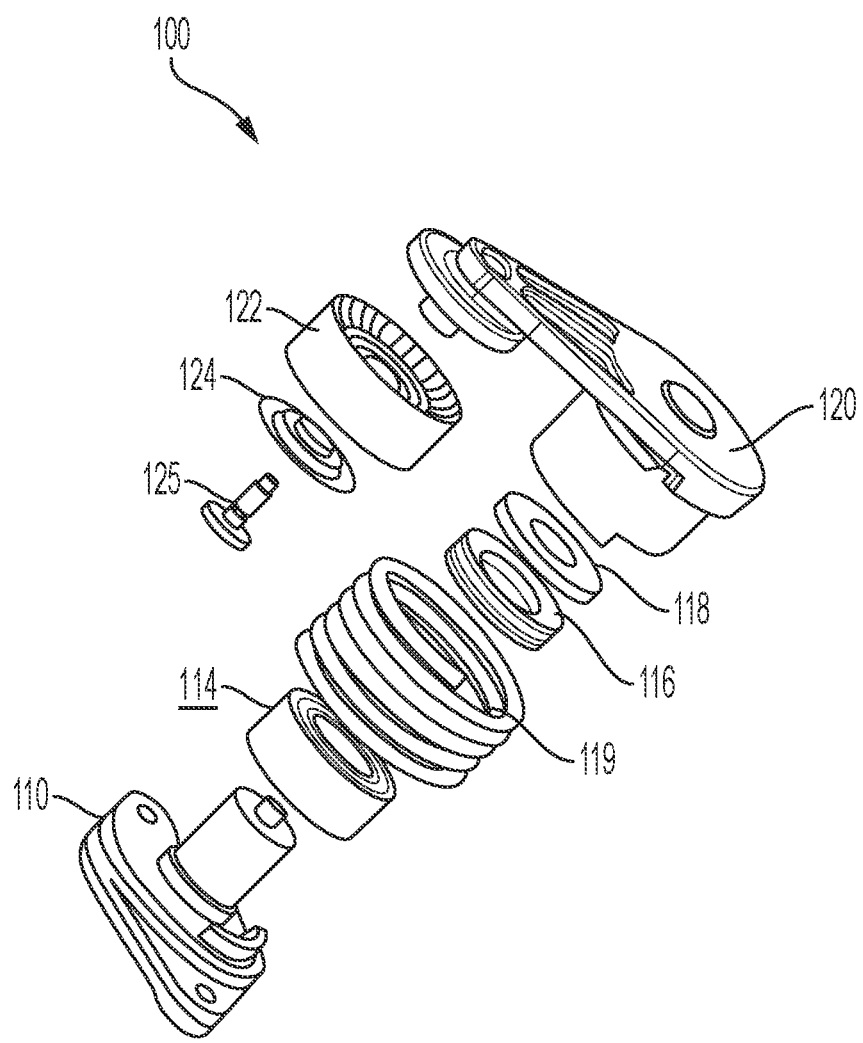
FIG. 3 is an exemplary exploded perspective view of the tensioner of FIGS. 1 and 2.

FIG. 2 is a cross-sectional side view of the tensioner 100 taken along line 2-2 of FIG. 1. FIG. 3 also shows the tensioner 100, in an exploded view.

The base structure 110 and the tensioning arm 120 rotationally mate with each other to form the tensioner 100. A pivot shaft 112 extends through the tensioner base 110 and the tensioning arm 120 and defines the pivot axis of the tensioner 100, or the axis of rotation between the tensioner base 110 and the tensioning arm 120. The pivot shaft 112 is fixed in relation to the tensioner base 110 and in some implementations is integral with the tensioner base 110. The tensioning arm 120 rotates or pivots about or at least partially around the pivot shaft 112.

A pivot bearing 114 surrounds the pivot shaft 112 in an area or aperture between the tensioning arm 120 and the pivot shaft 112. The pivot bearing 114 is centered around the pivot shaft 112 and the axis of rotation and seats on a shoulder of the pivot shaft 112. In other implementations, the lower surface of the pivot bearing 114 is in frictional contact with a surface of the tensioner base 110. The pivot bearing 114 has a length less than the length of the pivot shaft 112. In some implementations, the pivot bearing 114 is fixed to the pivot shaft 112 and the tensioning arm 120 rotates in relation to the pivot bearing 114. In other implementations, the pivot bearing 114 is fixed to the tensioning arm 120 and can rotate with the tensioning arm 120 in relation to the pivot shaft 112 and the tensioner base 110. In yet other implementations, the pivot bearing 114 is fixed to both the tensioning arm 120 and the pivot shaft 112, so that rotation occurs internal to the bearing 114.

The pivot bearing 114 can be a rotary bearing, e.g., a ball bearing or a roller bearing, and could be tapered or not. The particular pivot bearing 114, best seen in FIG. 2, is a double row ball bearing.

Also present in the area or aperture with the pivot bearing 114 is a compression spring 116, more distal from the tensioner base 110 than the pivot bearing 114. The compression spring 116 generates a damping force. Similar to the pivot bearing 114, the compression spring 116 is centered around the pivot shaft 112 and the axis of rotation and extends axially. The compression spring 116 may be a helical spring having a constant diameter or a varying diameter along its length. Any suitable helix type, wire diameter and/or cross-section (e.g., circular, rectangular, oval), material, free length, and spring end types can be used for the compression spring 116. In some implementations, alternate designs may be used for the compression spring 116; for example, a volute spring, torsion spring, or leaf spring may be used; disc spring(s) or Bellville washer(s) may even be used. In some implementations, two helical springs may be used; e.g., two compression springs in parallel, or a compression spring can be an internal spring and a torsional spring can be an external spring.

Additionally, also present in the area or aperture with the pivot bearing 114 and compression spring 116 is a damping mechanism 118, more distal from the tensioner base 110 than the pivot bearing 114, and, in the shown implementation, more distal from the tensioner base 110 than the compression spring 116. Similar to the pivot bearing 114 and the compression spring 116, the damping mechanism 118 is centered around the pivot shaft 112 and the axis of rotation and extends axially. The damping mechanism 118 is a disk, e.g., formed of metal, plastic, or a combination thereof. The damping mechanism 118 has a center aperture that allows the damping mechanism 118 to slide axially along the pivot shaft 112 but is restrained from rotational movement relative to the shaft 112.

Present external to the tensioning arm 120, centered around the pivot shaft 112 and at least the pivot bearing 114, and around the axis of rotation, is a torsion spring 119. The torsion spring 119 may have any leg arrangement or orientation.

As indicated above, FIG. 3 is an exploded perspective view of the tensioner 100, showing the tensioning arm 120 with a pulley 122 around which a belt to be tensioned would be positioned. The pulley 122 and a dust shield 124 and is held onto the arm 120 with a bolt 125.

FIG. 3 illustrates the alignment of the pivot shaft 112 with the pivot bearing 114, the compression spring 116, the damping mechanism 118, and the torsion spring 119, all along the central axis C (shown in FIG. 2), which is also the axis of rotation.

It is noted that the components including the pivot shaft 112, the pivot bearing 114, the compression spring 116, the damping mechanism 118, and the torsion spring 119 are generally radially symmetrical about the central pivot axis. As seen in FIG. 1, the base structure 110 and the tensioning arm 120 are not symmetrical about the pivot axis.

In some implementations, as seen in FIGS. 2 and 3, the tensioner 100 does not have a conventional labyrinth nor a dust cap aligned with the pivot shaft 112 or the pivot axis. Rather, the tensioner 100 uses the pivot bearing 114 and its associated seal to protect the damping mechanism 118 from external contaminants, such as those that might enter from via the interface between the base structure 110 and the tensioning arm 120. External contaminants would need to pass through the bearing seal in order to impact the pivot area and the damping mechanism 118.

The compression spring 116 also is protected by the seal of the pivot bearing 114.

To assemble the belt tensioner 100, the pivot bearing 114 is first pressed onto the tensioner base 110 around the pivot shaft 112, and then to the arm 120, having the torsion spring 119 therearound, creating a protective area for the damping mechanism.

Figure 4:
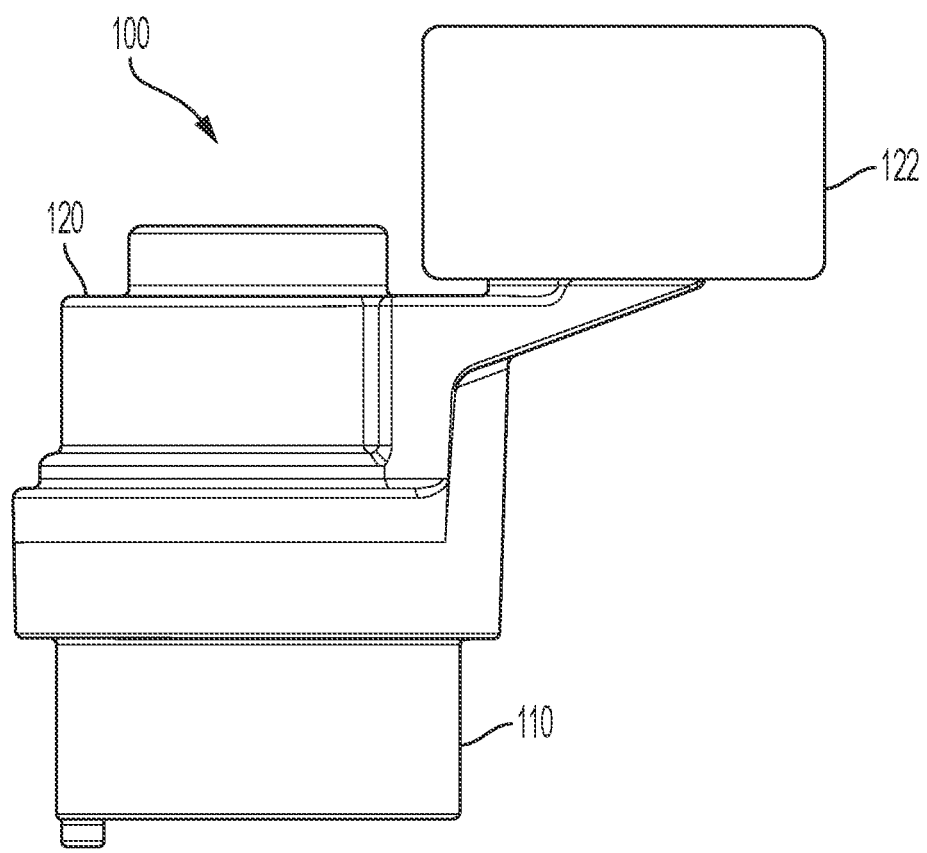
FIG. 4 is an exemplary side perspective view of another implementation of a tensioner.
Figure 5:
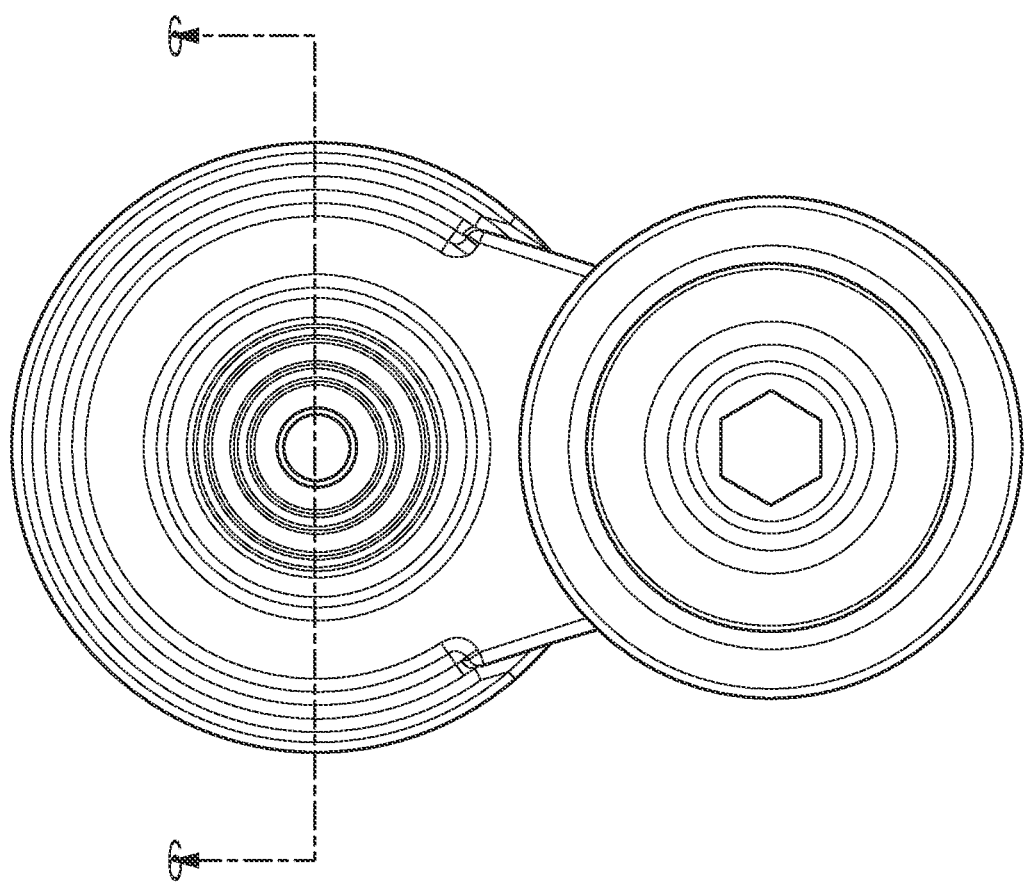
FIG. 5 is an exemplary top perspective view of another implementation of a tensioner.
Figure 6:
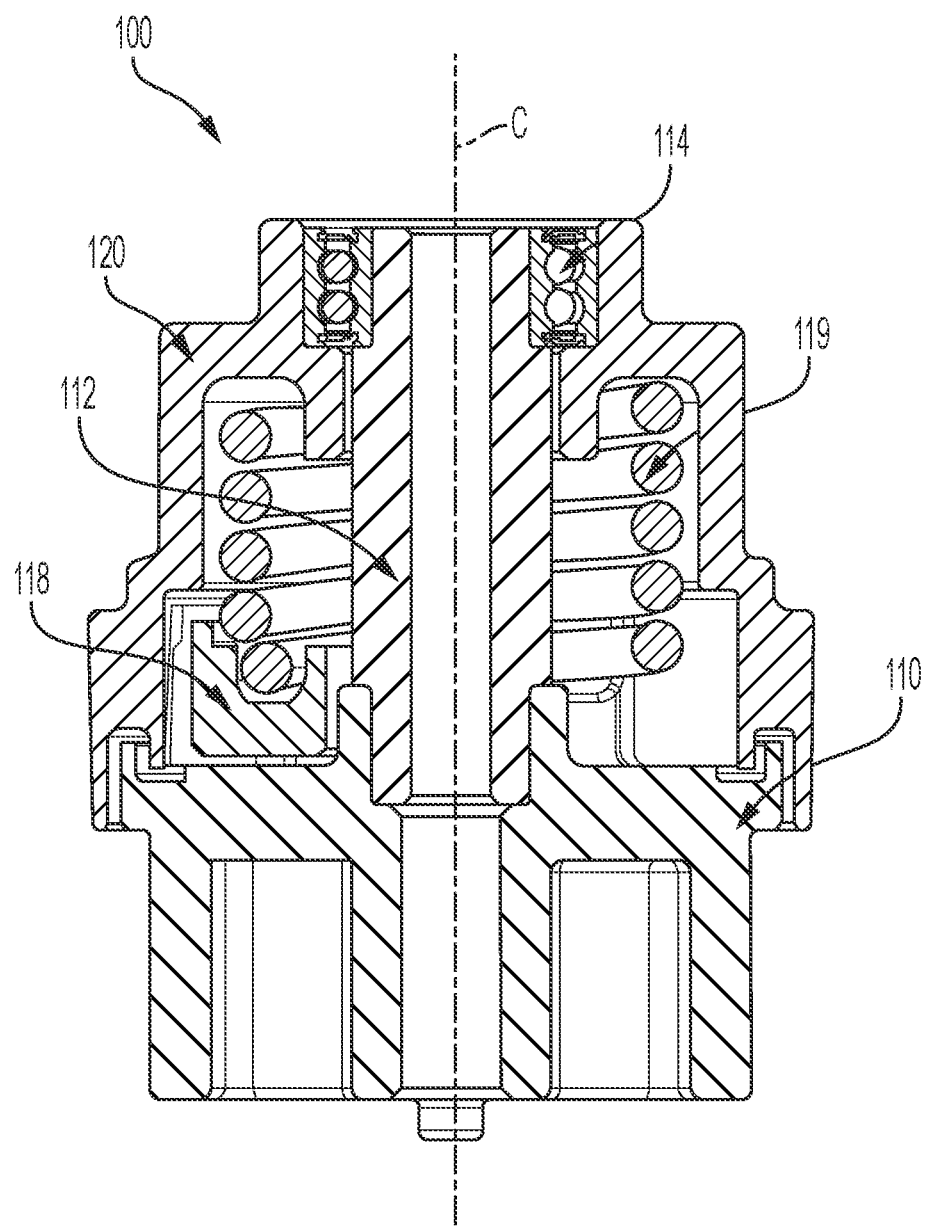
FIG. 6 is an exemplary cross-sectional side view of another implementation of a tensioner taken along line 6-6 of FIG. 5.

FIGS. 4, 5, 6, and 7 depict an alternate implementation of the tensioner 100. FIG. 4 depicts a side perspective of the tensioner. FIG. 5 depicts a top perspective of the tensioner. FIG. 6 is a cross-sectional side view of the tensioner taken along line 6-6 of FIG. 5. FIG. 6 is an exploded perspective view of the implementation depicted in FIGS. 4 and 5.

The base structure 110 and the tensioning arm 120 rotationally mate with each other to form the tensioner 100. A pivot shaft 112 extends through the tensioner base 110 and the tensioning arm 120 and defines the pivot axis of the tensioner 100, or the axis of rotation between the tensioner base 110 and the tensioning arm 120. The pivot shaft 112 is fixed in relation to the tensioner base 110 and in some implementations is integral with the tensioner base 110. The tensioning arm 120 rotates or pivots about or at least partially around the pivot shaft 112.

A pivot bearing 114 surrounds the pivot shaft 112 in an area or aperture between the tensioning arm 120 and the pivot shaft 112. The pivot bearing 114 is centered around the pivot shaft 112 and the axis of rotation and seats on a shoulder of the pivot shaft 112. In other implementations, the lower surface of the pivot bearing 114 is in frictional contact with a surface of the tensioner base 110. The pivot bearing 114 has a length less than the length of the pivot shaft 112. In some implementations, the pivot bearing 114 is fixed to the pivot shaft 112 and the tensioning arm 120 rotates in relation to the pivot bearing 114. In other implementations, the pivot bearing 114 is fixed to the tensioning arm 120 and can rotate with the tensioning arm 120 in relation to the pivot shaft 112 and the tensioner base 110. In yet other implementations, the pivot bearing 114 is fixed to both the tensioning arm 120 and the pivot shaft 112, so that rotation occurs internal to the bearing 114.

The pivot bearing 114 can be a rotary bearing, e.g., a ball bearing or a roller bearing, and could be tapered or not. The particular pivot bearing 114, best seen in FIG. 2 and FIG. 3, is a double row ball bearing.

FIG. 5 depicts another implementation of a bearing seal tensioner assembly. In this implementation the base structure 110 and the tensioning arm 120 rotationally mate with each other to form the tensioner 100. A pivot shaft 112 extends through the tensioner base 110 and the tensioning arm 120 and defines the pivot axis of the tensioner 100, or the axis of rotation between the tensioner base 110 and the tensioning arm 120. The pivot shaft 112 is fixed in relation to the tensioner base 110 and in some implementations is integral with the tensioner base 110. The tensioning arm 120 rotates or pivots about or at least partially around the pivot shaft 112.

A pivot bearing 114 surrounds the pivot shaft 112 in an area or aperture between the tensioning arm 120 and the pivot shaft 112. The pivot bearing 114 is centered around the pivot shaft 112 and the axis of rotation and seats on a shoulder of the pivot shaft 112. In other implementations, the pivot bearing 114 may be radially position between the pivot shaft 112 and the torsion spring 119. The pivot bearing 114 has a length less than the length of the pivot shaft 112. In some implementations, the pivot bearing 114 is fixed to the pivot shaft 112 and the tensioning arm 120 rotates in relation to the pivot bearing 114. In other implementations, the pivot bearing 114 is fixed to the tensioning arm 120 and can rotate with the tensioning arm 120 in relation to the pivot shaft 112 and the tensioner base 110. In yet other implementations, the pivot bearing 114 is fixed to both the tensioning arm 120 and the pivot shaft 112, so that rotation occurs internal to the bearing 114.

The pivot bearing 114 can be a rotary bearing, e.g., a ball bearing or a roller bearing, and could be tapered or not. The particular pivot bearing 114, best seen in FIG. 6, is a double row ball bearing.

In some implementations, the torsion spring 119 may be terminated, secured, mated, or attached to the tensioning arm 120 at a first end and may be terminated, secured, mated, or attached to the damping mechanism 118 at a second end. The rotation of the tensioner about the central axis when the belt is under load may cause the torsion spring 119 to constrict or expand thereby altering the damping force applied by the torsion spring 119 through the damping mechanism 118 as it radially contacts the inner wall of the tensioning arm 120. In some implementations, damping may also occur through the damping mechanism 118 contacting the tensioner base 110 in the radial and/or axial directions. In this implementation, the torsion spring is retained between the inner walls for the tensioning arm 120 and the tensioner base 110. The torsion spring 119 generates a damping force. The torsion spring 119 may be radially positioned around the pivot shaft 112. The torsion spring 119 may be a torsion spring having a constant diameter or a varying diameter along its length. Any suitable helix type, wire diameter and/or cross-section (e.g., circular, rectangular, oval), material, free length, and spring end types may be used for the torsion spring 119. In some implementations, alternate designs may be used for the torsion spring 119; for example, a volute spring or a helical spring. The torsion spring 119 may have any leg arrangement or orientation.

Additionally, a damping mechanism 118 may be present. In some implementations, the damping mechanism 118 may be radially positioned between the pivot shaft 112 the tensioning arm 120. Similar to the pivot bearing 114 and the torsion spring 119, the damping mechanism 118 is radially centered around the pivot shaft 112 and the axis of rotation and extends axially. The damping mechanism 118 may be an arc structure having a similar radius as the inner wall of the tensioning arm 120. The damping mechanism may also be formed as a block, plate, disc or the like. The damping mechanism 118 may be formed of metal, plastic, or a combination thereof. The damping mechanism 118 may be positioned around a second end of the torsion spring 119, the second end being the end of the torsion spring that is not terminated, secured, mated, or attached to the tensioning arm 120.

Figure 7:
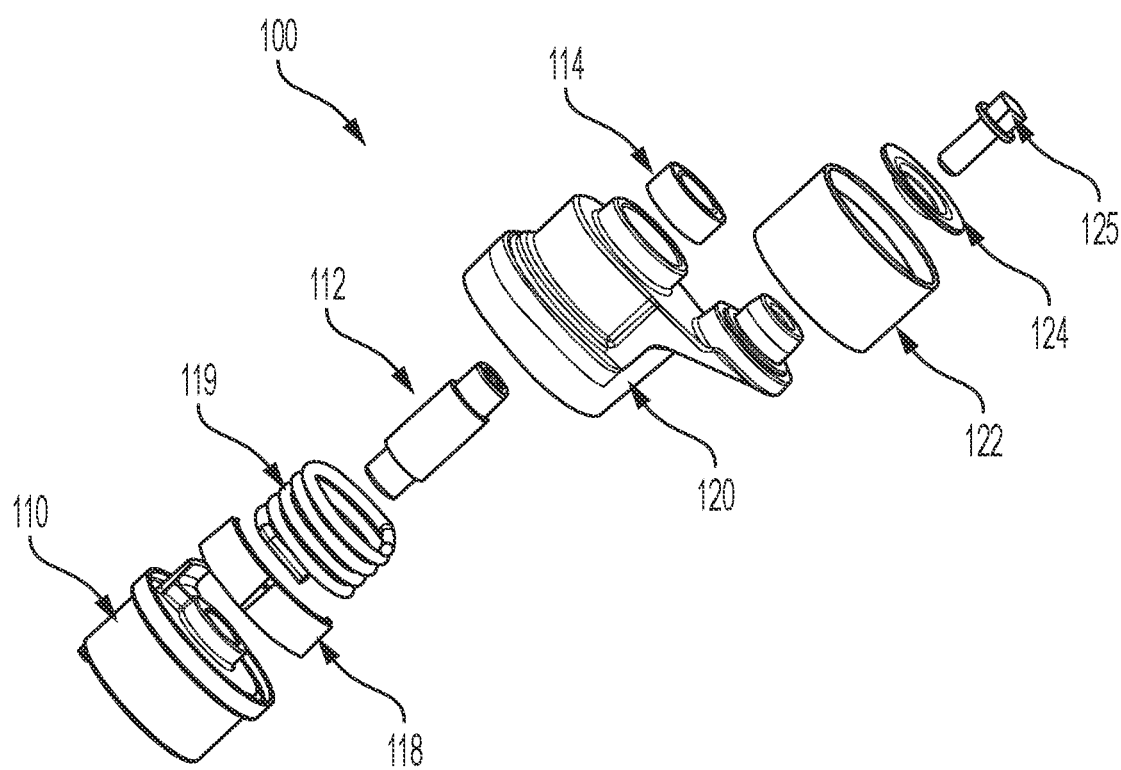
FIG. 7 is an exemplary exploded perspective view of another implementation of the tensioner of FIGS. 4, 5, and 6.

As indicated above, FIG. 7 is an exploded perspective view of the tensioner 100, showing the tensioning arm 120 with a pulley 122 around which a belt to be tensioned would be positioned. The pulley 122 and a dust shield 124 are held onto the arm 120 with a bolt 125 or other fastening mechanisms, such as but not limited to a retaining pin, push pin, latch clip, or the like.

FIG. 7 illustrates the alignment of the pivot shaft 112 with the pivot bearing 114, the damping mechanism 118, and the torsion spring 119, all along the central axis, which is also the axis of rotation.

It is noted that the components including the pivot shaft 112, the pivot bearing 114, and the torsion spring 119 are generally radially symmetrical about the central pivot axis. As seen in FIG. 7, the base structure 110, the damping mechanism, and the tensioning arm 120 are not symmetrical about the pivot axis.

In other implementations, as seen in FIGS. 6, the tensioner 100 has a conventional labyrinth aligned with the pivot shaft 112 or the pivot axis. However, tensioner 100 uses the pivot bearing 114 and its associated seal to protect the damping mechanism 118 from external contaminants. However, contaminants that may enter via the interface between the base structure 110 and the tensioning arm 120 may have a difficult time entering the inner area of the tensioner due to the labyrinth molded into the tensioning arm 120 and the tensioner base 110. In some implementations due to the utilization of the pivot bearing 114 and damping mechanism 118, a seal such as a rubber gasket, polymer gasket, or the like may be used as a seal between the tensioner base 110 and the tensioning arm 120 to seal the tensioning spring 119 and damping mechanism 118 from contamination. The pivot bearing 114 and damping mechanism 118 may provide longer life for a tensioner 100. In other implementations, the pivot bearing 114 and the damping mechanism 118 may allow for packaging of a short or long arm tensioner.

The various components or parts of the tensioner 100 and variations thereof may be formed of any suitable material, including metal (e.g., iron, steel, aluminum), composite materials (e.g., ceramics), polymeric materials, and any combination thereof. Any of the components or parts may have a coating thereon to, e.g., decrease surface friction, increase durability and decrease physical wear, increase chemical resistance, etc.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

The tensioners described herein and variations thereof may be incorporated into a broad range of belt drive systems and other systems that utilize tensioners, including ABDS (accessory belt drive systems), SBDS (synchronous belt drive system), BSG (belt starter generator, e.g., for hybrid vehicles), dual arm tensioners, CVT (continuously variable transmissions), serpentine belts, water pumps, timing, etc. The tensioners can be used with v-belts, micro-v belts, double v belts, flat belts, round belts, etc., that may be made from rubber or polymer (e.g., polyurethane) and may be reinforced.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

What is claimed is:

1. A belt tensioner for a belt drive, comprising:
   a tensioner base and a tensioning arm axially aligned about a pivot shaft defining a pivot axis, the tensioning arm pivotal in relation to the tensioner base about the pivot axis, and a sealed pivot bearing positioned around and sealed against the pivot shaft, the tensioning arm positioned around the sealed pivot bearing, a damping mechanism, wherein a torsion spring and damping mechanism are positioned radial to the pivot shaft and having the tensioning arm positioned therearound, wherein the tensioning arm is axially positioned between the torsion spring and the sealed pivot bearing, and the torsion spring is axially positioned between the sealed pivot bearing and the damping mechanism, wherein the damping mechanism is configured to engage an inner radial wall of the tensing arm.

2. The tensioner of claim 1, wherein the damping mechanism is secured to a second end of the torsion spring and a first end of the torsion spring is mated to the tensioning arm.

3. The tensioner of claim 2, wherein the damping mechanism is positioned around the second end of the torsion spring.

* * * * *